June 19, 1951 G. D. FORBES 2,557,644
ELECTRONIC SWITCHING CIRCUIT
Filed April 2, 1946
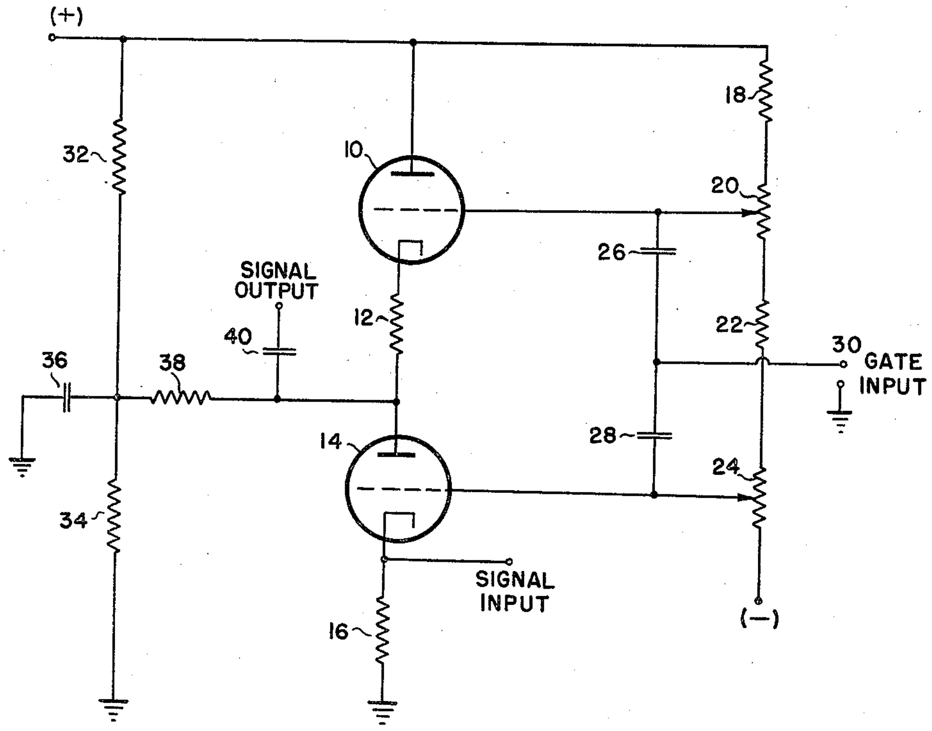
INVENTOR.
GORDON D. FORBES
BY
William D. Hall
ATTORNEY Patented June 19, 1951

2,557,644

UNITED STATES PATENT OFFICE 2,557,644

ELECTRONIC SWITCHING CIRCUIT

Gordon D. Forbes, Sudbury, Mass., assignor, by mesne assignments, to United States of America as represented by the Secretary of War Application April 2, 1946, Serial No. 658,937

4 Claims. (Cl. 250—27)

This invention relates to electrical circuits and more particularly to electronic switching circuits.

In certain applications of electronics it is desirable to electrically switch on and off signal channels. It is often further desirable to utilize one signal channel or piece of apparatus for two signals which are to be applied thereto alternately, in which case two switching circuits are normally required. In specific applications of electronics, such as in radar systems or other apparatus employing short duration pulse signals, it may be desired to actuate or to blank certain signal channels through which the pulse signals normally pass. The signal channels in such an instance normally have considerable band width and the band width considerations must not be affected by the switching action. Since the signal channel is normally switched by application of a rectangular gate voltage, circuits used heretofore have produced highly undesirable transients in the output signal. Elimination of these transients has heretofore been accomplished with a sacrifice in band width.

It is an object of the present invention, therefore, to provide a novel electronic switch which does not affect the band width of the channel through which the signal passes.

It is a further object of the present invention to provide an electronic switch in which no transients appear in the output channel due to the switching gate signal.

For a better understanding of the invention together with other and further objects thereof, reference is had to the following description which is to be read in connection with the accompanying drawing which is a circuit diagram of the present invention.

In the drawing, the anode of an electron tube 10, preferably of the triode type, is connected to a suitable source of positive potential. The cathode of the tube 10 is connected through a resistor 12 to the anode of an electron tube 14. The cathode of the tube 14 is connected to ground through a suitable resistor 16. The tubes 10 and 14 are identical in electrical characteristics, and the resistances of the resistors 12 and 16 are equal. A voltage divider comprising resistor 18, potentiometer 20, resistor 22, and potentiometer 24 is connected between the aforementioned positive potential source and a suitable source of negative potential. A tap on the potentiometer 20 is connected to a control grid of the tube 10. A tap on the potentiometer 24 is connected to a control grid of the tube 14. The aforementioned control grids of the tubes 10 and 14 are connected through capacitors 26 and 28, respectively, to terminal 30. A voltage divider comprising resistors 32 and 34, which are of equal resistance, is connected between the positive potential source and ground. The junction of the resistors 32 and 34 is connected through a filtering capacitor 36 to ground and is also connected through a resistor 38 to the anode of the tube 14. Input signals are applied to the cathode of the tube 14 and the output signals are taken from the anode of the tube 14 through a capacitor 40.

As has been before stated, the tubes 10 and 14 are identical in electrical characteristics and the resistors 12 and 16 have equal resistances. The taps on the potentiometers 20 and 24 are adjusted until the control grid-to-cathode potentials of the tubes 10 and 14 are equal. Under this operating condition, equal voltage drops appear across the tubes 10 and 14 and the potential at the anode of the tube 14 is substantially one-half of the aforementioned positive potential. It has also been stated that the resistors 32 and 34 have equal resistances and, therefore, the potential of their junction is equal to substantially one-half of the aforementioned positive potential. Therefore, under quiescent conditions substantially no current flows through the resistor 38. When the switching circuit of the present invention is "on," signals applied to the cathode of the tube 14 continue through the circuit without alteration, appearing at the anode of this tube. The load resistance into which the tube 14 operates can be calculated, knowing the electrical characteristics of the two tubes and the values of the circuit constants used. When it is desired to place the switching circuit in the "off" condition, so that signals applied thereto are not passed through, a negative gate signal of sufficient magnitude to render both of the tubes 10 and 14 non-conductive is applied to the terminal 30. Because the tubes 10 and 14 have identical electrical characteristics and because they are operating under identical quiescent conditions, the quiescent current flow through the two tubes is equal. This is also true during the short interval of time in which the tubes 10 and 14 are rendered non-conducting, because both tubes are affected in the same manner by the gate signal. Since the two tube currents are at all times equal, no current flows through the resistor 38 and, therefore, no signal appears at the output through capacitor 40. When the circuit is turned "on," the two tubes again conduct equal currents at all times, and again no current flows through the resistor 38, and, therefore, no undesired signal appears in the output.

While there has been described hereinabove what is at present considered to be a preferred embodiment of this invention, it will be obvious to those skilled in the art that various changes and modifications may be made therein without departing from the spirit and scope of the invention.

What is claimed is:

1. An electronic switch operated by an external gate signal and comprising a suitable source of biasing potential having B+, ground and B− terminals, a first electron tube having at least anode, control grid and cathode elements, and further having the anode element thereof connected to said B+ terminal, a second electron tube having at least anode, control grid and cathode elements, a first resistor connected between the cathode element of said first tube and the anode element of said second tube, a second resistor connected between the cathode element of said second tube and said ground terminal, a first voltage divider network connected between said B+ and B− terminals and having taps thereon connected to the control elements of said first and second tubes, first and second capacitors connected respectively to said control elements of said first and second tubes for applying said gate signal thereto, a third resistor connected to the anode element of said second tube, a second voltage divider network connected between said B+ and ground terminals and having a tap thereon connected to said third resistor, said last mentioned tap being so located that no quiescent current flows through said third resistor, means providing an input connection to the cathode element of said second tube, and means providing an output connection from the anode element of said second tube.

2. An electronic switch operated by an external gate signal and comprising a source of potential, first and second electron tubes serially connected across said source of potential, a two terminal load impedance having one terminal thereof connected to a point between said first and second tubes, bias means connected across said source of potential for biasing said tubes and causing the quiescent voltages across said first and second tubes to be equal, a voltage divider network connected across said source of potential and having a tap thereon connected to the remaining terminal of said load impedance, said tap being so located that no potential occurs across said load impedance under quiescent conditions, means providing an input connection to said second tube, means providing an output connection from said second tube, and means associated with said first and second tubes for rendering said first and second tubes simultaneously non-conducting by application thereto of said external gate signal.

3. An electronic switch operated by an external gate signal and comprising first and second serially connected electron tubes both adapted to be rendered non-conducting by said gate signal, means associated with at least one of said electron tubes for providing input and output connections thereto, and means for applying potentials to said first and second tubes for causing the quiescent currents through said first and second tubes to be equal, whereby no transient signal will appear at said output connection when said electronic switch is operated by said external gate signal.

4. An electronic switching circuit including, at least two serially connected vacuum tubes, means to normally establish equal quiescent currents through each of said tubes, means for providing an output signal from one of said tubes when an input signal is applied thereto, and means receptive of gate signals for simultaneously rendering both of said tubes non-conductive, whereby said switch may be operated by said gate signals to cut off said output signal without causing a transient signal due to the switching operation to appear in said output means.

GORDON D. FORBES.

REFERENCES CITED

The following references are of record in the file of this patent:

UNITED STATES PATENTS

| Number | Name | Date |
|---|---|---|
| 2,088,584 | Bucky | Aug. 3, 1937 |
| 2,140,102 | Bowman-Manifold et al. | Dec. 13, 1938 |
| 2,305,307 | Wellenstein et al. | Dec. 15, 1942 |
| 2,329,073 | Mitchell et al. | Sept. 7, 1943 |
| 2,350,008 | Artzt | May 30, 1944 |
| 2,356,733 | Banker | Aug. 29, 1944 |